United States Patent [19]

Campagnolo

[11] 4,157,608

[45] Jun. 12, 1979

[54] FIXTURE FOR SPECIAL GEARS, PARTICULARLY OF BICYCLES

[76] Inventor: Tullio Campagnolo, Corso Padova, 168, 36100 Vicenza, Italy

[21] Appl. No.: 864,935

[22] Filed: Dec. 27, 1977

[30] Foreign Application Priority Data

Dec. 27, 1976 [IT] Italy ................................ 30888 A/76

[51] Int. Cl.² ............................................. B23P 19/04
[52] U.S. Cl. ......................................... 29/240; 29/283; 81/68; 269/47
[58] Field of Search ...................... 29/283, 240; 81/68, 81/69; 269/47

[56] References Cited

U.S. PATENT DOCUMENTS

| 1,150,663 | 8/1915 | Cosseboon | 81/68 |
| 2,242,080 | 5/1941 | Kurzina | 29/240 |

FOREIGN PATENT DOCUMENTS

| 648483 | 8/1928 | France | 81/68 |
| 427850 | 12/1947 | Italy | 81/68 |

*Primary Examiner*—James L. Jones, Jr.
*Attorney, Agent, or Firm*—Young & Thompson

[57] ABSTRACT

A fixture for the assembly and disassembly of special gears (particularly of gears of free-wheels applied to the rear wheel of bicycles) consists of a first tool which comprises an appropriately shaped, metal elongated plate, having a smooth handgrip and a functional part provided with a plurality of impressions corresponding to elements of a free-wheel unit and apt to house at least part of said elements by mating with their shape so as to prevent rotation thereof, threaded holes being provided at the center of said impressions, and at least two locking pin members apt to be screwed into said threaded holes for locking on the plate, in said impressions, the elements of the free-wheel unit having to be handled, and of a second tool of the type comprising a handle terminating with a halfmoon shaped body, to an end of which is pivoted a transmission chain section for bicycles, a notch being provided along the whole inner archway of the half-moon shaped body of said tool, for housing the periphery of a gear with which the tool is in engagement.

3 Claims, 5 Drawing Figures

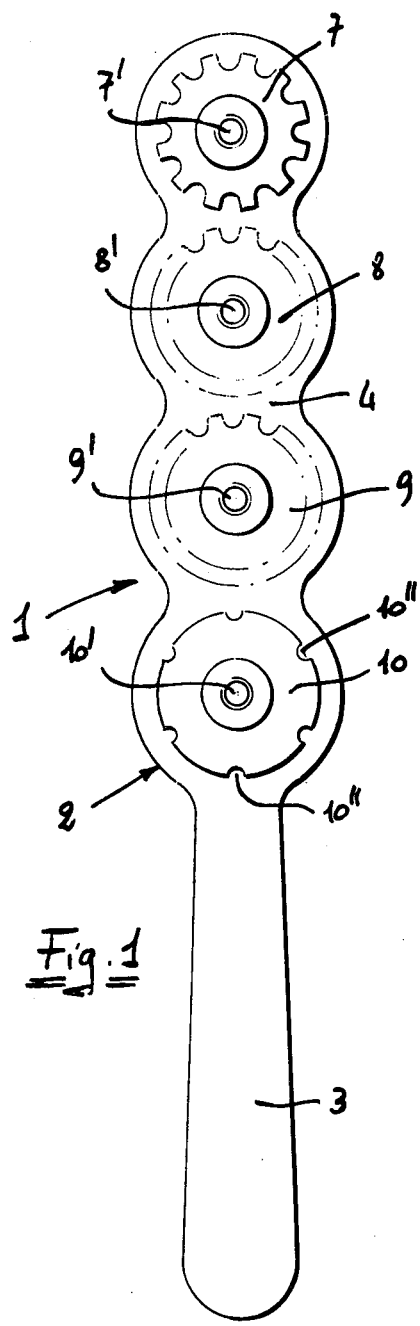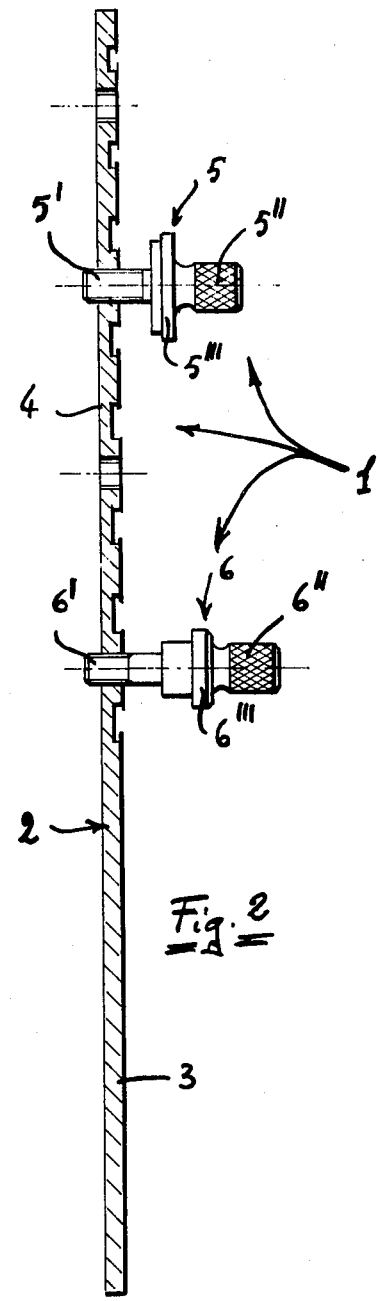

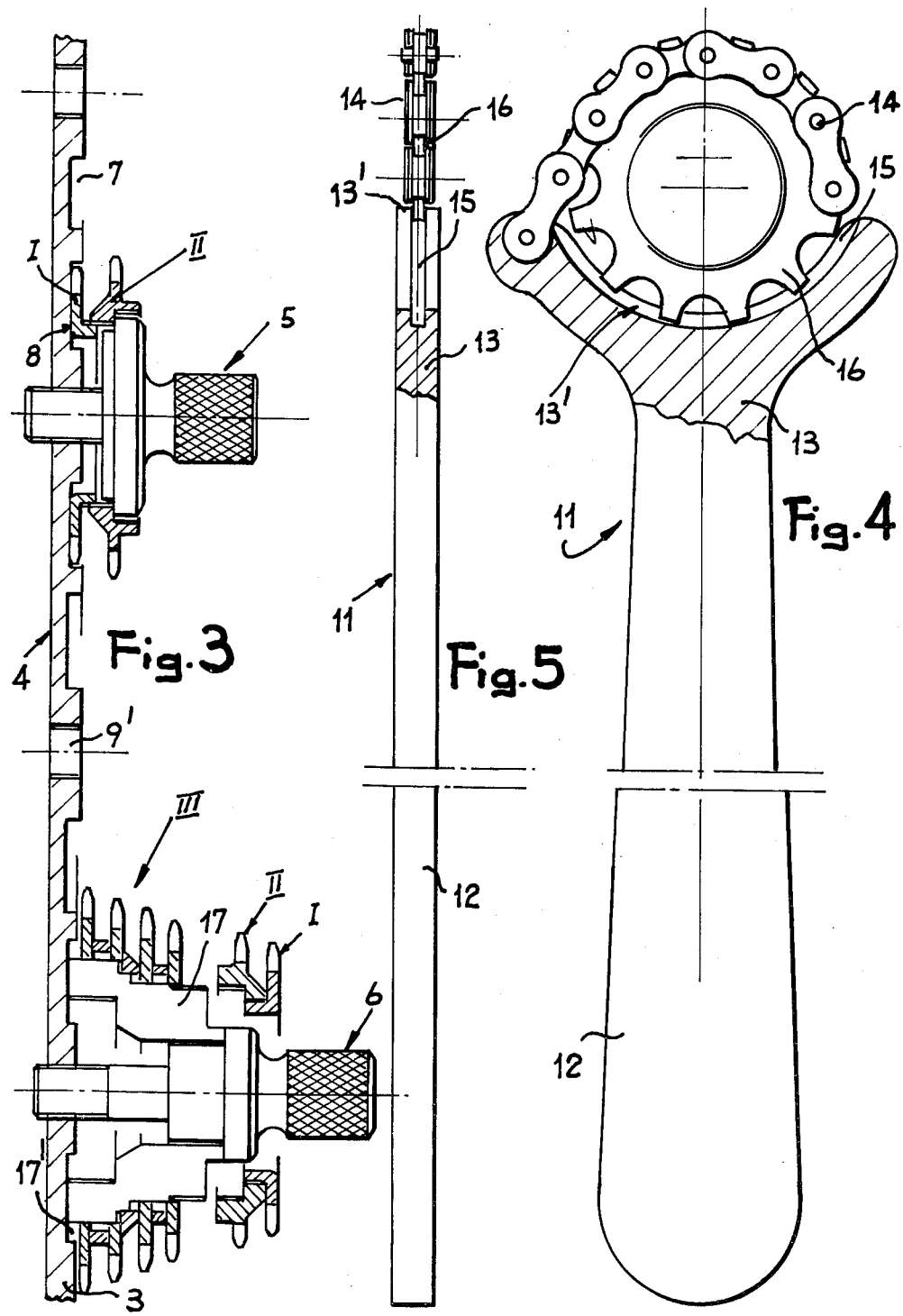

FIXTURE FOR SPECIAL GEARS, PARTICULARLY OF BICYCLES

BACKGROUND OF THE INVENTION

The present invention relates to a fixture for the assembly and disassembly of special gears, said fixture being more specifically meant in particular for the assembly and disassembly of gears of free-wheels applied to the rear wheel of bicycles from the free-wheel unit of which they form part.

It is known that a free-wheel unit for bicycles comprises two coaxial bodies, of which the outermost body is apt to roll over the inner one, and a plurality of chain gears (generally four, five or six, according to the type and use of the bicycle), of which one part is keyed, and the last one or two are screwed, onto the outer body of the unit.

It is also known that in sports bicycles in general, but especially in competition bicycles, it is often necessary to replace the gears forming the free-wheel unit, by means of which gears one controls—through the gearshift—the rotation of the rear wheel by acting on the pedals. These operations of replacing the gears become particularly important when they have to be carried out during cycling races—as for example, in particular, the Tour of Italy and the Tour of France—in which it is often necessary to replace the ratios of all the bicycles of the team at each goal, in order to adapt the bicycle itself to the characteristics of the courses being followed which can vary, even considerably, every day. One can hence understand the importance of being able to replace the gears of the free-wheel units promptly and easily.

Up to date, the possibility to carry out the above operation of replacement promptly and easily has just been wishful thinking in the mind of the skilled in the art, who have been forced to perform said operation with makeshifts (making the work toilsome, long and often inaccurate, and at times causing damage to the parts involved) or with complicated, bulky tools of difficult use.

SUMMARY OF THE INVENTION

All these drawbacks are fully and efficiently remedied by the present invention, which relates to a fixture comprising an original tool for handling the single elements to be mounted or removed from a free-wheel unit of a bicycle, and an improved tool for acting on said elements carried by the first tool. The invention also relates to the assembly and disassembly system which can be carried out by using said tools.

More particularly, the original tool according to the invention consists of an appropriately shaped, metal elongated plate, comprising a smooth handgrip and a functional part provided with a plurality of impressions corresponding to elements of a free-wheel unit and apt to house at least part of said elements by mating with their shape so as to prevent rotation thereof, threaded holes being provided at the centre of said impressions, and of at least two locking pin members apt to be screwed into said threaded holes for locking on the plate, in said impressions, the elements of the free-wheel unit having to be handled.

The improved tool according to the invention in turn comprises a handle and a half-moon shaped body, to an end of which is pivoted a transmission chain section for bicycles, and is characterized in that a notch is provided along the whole inner archway of the half-moon shaped body, for housing the periphery of a gear with which the tool is in engagement.

According to the invention, the system of assembly and disassembly of the free-wheel unit elements comprises the steps of: inserting the unit or the elements thereof to be mounted or removed, into one of the impressions of said plate of the first tool; locking such elements thereon by means of one of the locking pin members of the same tool; and applying the second tool to the element to be mounted or removed, by screwing it or unscrewing it with a manual combined operation of both tools.

BRIEF DESCRIPTION OF THE DRAWINGS

The invention is now described in further detail, by mere way of example, with reference to the accompanying drawings, which represent a referred embodiment thereof and in which:

FIG. 1 is a front view of the original tool plate according to the present invention;

FIG. 2 is a side view of the same plate and of the two locking pin members forming therewith said original tool;

FIG. 3 shows two ways of using the original tool according to the invention;

FIG. 4 is a front view of the improved tool according to the invention, designed to cooperate with the first tool for obtaining the fixture and carrying out the assembly and disassembly system according to the invention; and FIG. 5 is a side view of the tool of FIG. 4.

DESCRIPTION OF THE PREFERRED EMBODIMENT

With reference to the drawings, it is seen that the original tool 1 according to the invention consists of a shaped metal plate 2 comprising a smooth handgrip 3 and a functional shaped part 4, and of a pair of locking pin members 5 and 6.

The functional part 4 of the plate 2 has four hollow aligned impressions 7, 8, 9 and 10 which reproduce the shape of three free-wheel gears of different size and, respectively, the shape of the base of the free-wheel outer body.

In said impressions are apt to be freely housed, so as to mate with their shape, three free-wheel gears of different size and, respectively, the base of the free-wheel outer body, so as to be stopped from rotation. At the centre of the impressions 7 to 10, the plate 2 comprises threaded holes 7', 8', 9', 10'.

The locking pin members 5 and 6 each comprise a threaded shank (5', 6'), a knurled control handle (5", 6") and a central shaped part 5''', for the front engagement of the gears and, respectively, of the free-wheel bodies. Such members are used, as will be seen hereinafter, to make integral—by screwing (operating the handles 5", 6") the threaded shanks 5', 6'into the holes 7' to 10'—the gears and/or free-wheel bodies to be mounted or removed, with the plate 2, into their respective prints.

The improved tool according to the invention—designed to strictly cooperate with the already described original tool— comprises, in known manner, a handle 12 ending into a half-moon shaped body 13, to an end of which is pivoted the first link of a section 14 of a transmission chain for bicycles. According to the invention, along the whole inner archway 13' of the half-moon shaped body 13 is provided a notch 15 apt to receive and guide the periphery of a free-wheel gear 16.

The assembly and disassembly system according to the invention will now be described, explaining at the same time the working of the aforespecified tools which allow to carry out said system. Particular reference is made to FIG. 3 of the drawings.

The problems one is faced with are usually two: the first one is to mount or remove the set of one or two gears (I and II in FIG. 3), screwed at the smaller diameter end of the outer body 17 of a free-wheel unit, so that the removal thereof from the free-wheel will allow the locking or unlocking (and in this second case, the disassembly) of the other gears III (which are keyed to the body 17 simply through a free axial sliding engagement between the grooves of the body 17 and the correspondingly shaped inner ribs of the gears). The second one is to screw together, or unscrew one from the other, the two gears I and II.

To solve the first problem it is sufficient, by making use of the already described fixture, to arrange the outer body 17 of the free-wheel, with its base flange 17' inside the impression 10 and with its grooves coupled with the ribs 10" of the impression itself, and make said body 17 integral with the plate 2 by screwing into the hole 10' the locking pin member 6. At this point, it is sufficient to engage the chain section 14 of the tool 11 with the teeth of the gear II and rest on the periphery of this latter the half-moon shaped body 13, so as to insert the periphery of the gear II into the notch 15, as shown in FIGS. 4 and 5 (which refer to an indefinite gear 16).

Then one holds, with one hand, the handgrip 3 of the tool 1 and, with the other hand, the handle 12 of the tool 11 so as to carry out a reciprocal rotation helping, in one sense, to tighten and, in the other sense, to loosen the screwing of the gear II onto the body 17. In this operation, the notch 15 guides correctly the mutual position of the rotating parts, reducing the effort and avoiding ill-distributed stresses, while there are no risks of any kind that the parts might escape the perfect control of the operator. It is hence possible to carry out a safe, swift and precise operation, as could not even be imagined with the means previously available.

Likewise, one solves the second problem. The gear I is now inserted into its impression on the tool 1 (choosing the impression of appropriate shape, in the case shown the impression 8) and is axially locked to the plate 2 by means of the locking pin member 5. As done previously, the tool 11 is then engaged with the gear II and the periphery of this latter is inserted in the notch 15, obtaining once more the correct positioning of the parts which allows, by subsequently acting on the handles of the two tools, to carry out the mutual screwing or unscrewing between the gears I and II. Even this operation allows to obtain the same advantages as the previous one, with an even more perceptible progress from the practical point of view, considering the size and conformation of the pieces involved which make their handling very difficult. It is thus possible to obtain the much desired qualities of high precision, very limited effort, operating safety and great rapidity.

It is understood that the embodiments of the invention may vary and that the operating details of the tools according to the invention may be modified and improved, without thereby departing from the scope of the present invention: for example, while the figures of the accompanying drawings provide for the tool 1 to carry four aligned impressions, around which develops the configuration of the plate 2, it is understood that a different number of impressions may be provided and that these may be differently arranged, with a different configuration of the plate 2.

I claim:

1. Fixture for the assembly and disassembly of gears, particularly for mounting and removing gears from the free-wheel units of bicycles, consisting of a first tool which comprises an appropriately shaped, metal elongated plate, having a smooth handgrip and a functional part provided with a plurality of impressions corresponding to elements of a free-wheel unit and apt to house at least part of said elements by mating with their shape so as to prevent rotation thereof, threaded holes being provided at the centre of said impressions, and at least two locking pin members apt to be screwed into said threaded holes for locking on the plate, in said impressions, the elements of the free-wheel unit having to be handled, and of a second tool of the type comprising a handle terminating with a half-moon shaped body, to an end of which is pivoted a transmission chain section for bicycles, a notch being provided along the whole inner archway of the half-moon shaped body of said tool, for housing the periphery of a gear with which the tool is in engagement.

2. System for carrying out the assembly and disassembly of gears of free-wheel units, using the tool fixture claimed in 1, said system comprising the steps of: inserting the unit or the elements thereof to be mounted or removed, into one of the impressions of said plate of the first tool; locking such elements thereon by means of one of the locking pin members of the same tool; and applying the second tool to the element to be mounted or removed, by screwing it or unscrewing it with a manual combined operation of both tools.

3. A fixture as claimed in claim 1, in which the first tool comprises four aligned impressions, around which develops the configuration of the plate of said tool.

* * * * *